United States Patent [19]

Miyazawa

[11] 4,179,092

[45] Dec. 18, 1979

[54] MOUNTING DEVICE FOR DOOR CLOSER

[75] Inventor: Hiroshi Miyazawa, Hiratsuka, Japan

[73] Assignee: Tokico Ltd., Kawasaki, Japan

[21] Appl. No.: 859,107

[22] Filed: Dec. 9, 1977

[30] Foreign Application Priority Data

Dec. 20, 1976 [JP] Japan ............................ 51-170674

[51] Int. Cl.$^2$ ............................................ F16M 13/00

[52] U.S. Cl. .................................... 248/309 R; 16/49; 16/71; 248/DIG. 6

[58] Field of Search ......................... 16/1, 49, 71, 72; 248/DIG. 6, 221.3, 222.1, 250, 224.2, 241, 309 R; 49/503

[56] References Cited

U.S. PATENT DOCUMENTS

| | | | |
|---|---|---|---|
| 2,155,627 | 4/1939 | Welch | 248/DIG. 6 |
| 2,288,637 | 7/1942 | Mauro | 248/DIG. 6 |
| 2,320,621 | 6/1943 | Lefebre | 248/DIG. 6 |
| 2,703,663 | 3/1955 | Connett | 248/DIG. 6 |
| 3,125,396 | 3/1964 | Bertram | 24/211 R X |
| 3,188,682 | 6/1965 | Check et al. | 16/49 |
| 3,908,224 | 9/1975 | Vitt | 16/164 |

*Primary Examiner*—Werner H. Schroeder
*Assistant Examiner*—Moshe I. Cohen
*Attorney, Agent, or Firm*—Wenderoth, Lind & Ponack

[57] ABSTRACT

A generally box-shaped main body or a housing of a door closer is snap fitted on or demounted from a mounting plate of a generally U-shaped or channel shaped form with two position control wall portions extending from opposite ends of a generally flat base portion, and the wall portions contacting the opposite side walls of the main body in face-to-face contact.

5 Claims, 9 Drawing Figures

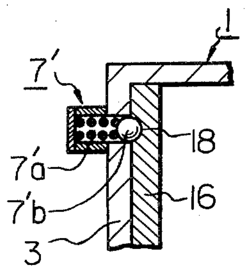
Fig. 3
Fig. 4 A
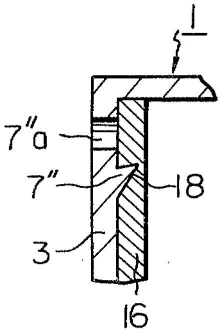
Fig. 4B
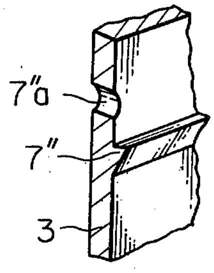
Fig. 4C
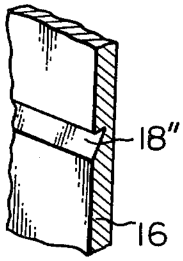
Fig. 6A
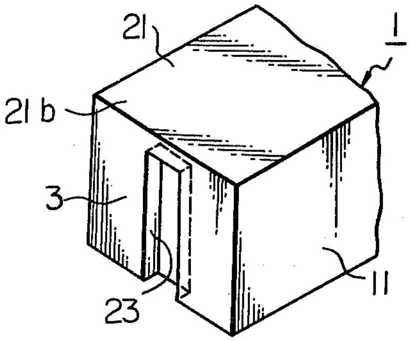
Fig. 5
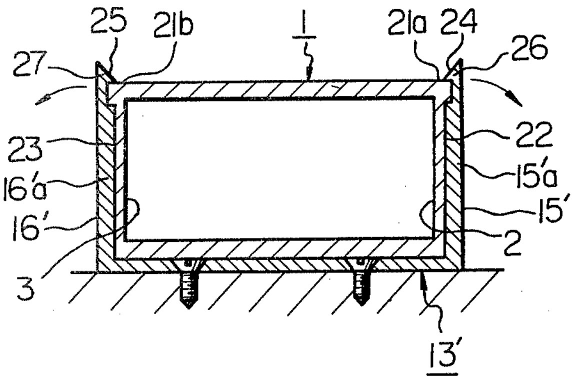
Fig. 6B
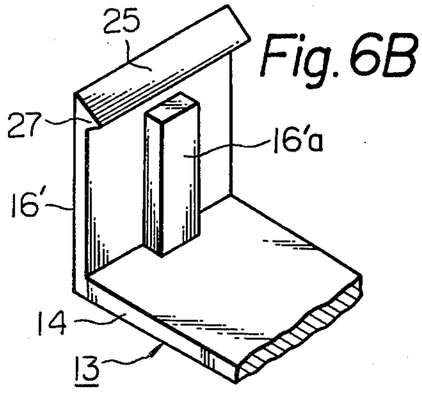

MOUNTING DEVICE FOR DOOR CLOSER

BACKGROUND OF THE INVENTION

This invention relates to a door closer or a device controlling the opening or closing speed of a door and, more particularly, to a mounting device for such a door closer.

Conventionally, a door closer is mounted at a high position such as the upper portion of a door or a lintel or the like and, usually, a mounting plate is secured to the high position beforehand, and the main body of the door closer is secured to the mounting plate by screws or the like. Thus the mounting operation is troublesome and labor consuming since a relatively heavy main body of the door closer is supported by one hand while screws are tightened by the other hand of the worker.

BRIEF SUMMARY OF THE INVENTION

An object of the present invention is to overcome aforesaid disadvantages of the conventional door closer by providing a mounting device for a door closer comprising a mounting plate having a pair of position controlling walls at opposite ends and integrally mounted on the mounting plate, a generally box-shaped main body having a pair of opposite side surfaces adapted to engage with said position controlling walls in face-to-face contact, and retaining means disposed on the walls and the main body.

BRIEF DESCRIPTION OF THE DRAWINGS

Some embodiments of the present invention are shown in the accompanying drawings, in which;

FIG. 3 is a partial cross-sectional view of a modified form of the door closer of the present invention;

FIG. 4*a* is a partial cross-sectional view of a further modified form of the door closer of the present invention;

FIGS. 4*b* and 4*c* are perspective views of the embodiment of FIG. 4*a*;

FIG. 5 is a cross-sectional view of another embodiment of the door closer of the present invention; and FIGS. 6*a* and 6*b* are perspective views showing a further modified embodiment of the door closer of the present invention.

DETAILED DESCRIPTION OF THE EMBODIMENTS

Figure 1:
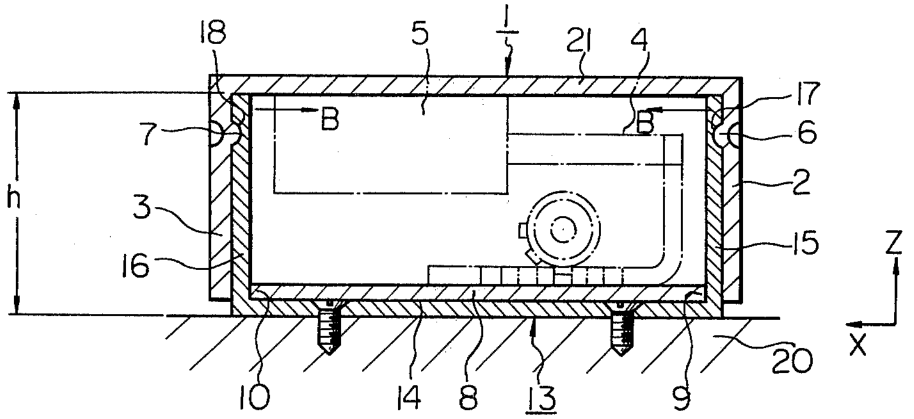
FIG. 1 is a cross-sectional view of a door closer according to the present invention.
Figure 2:
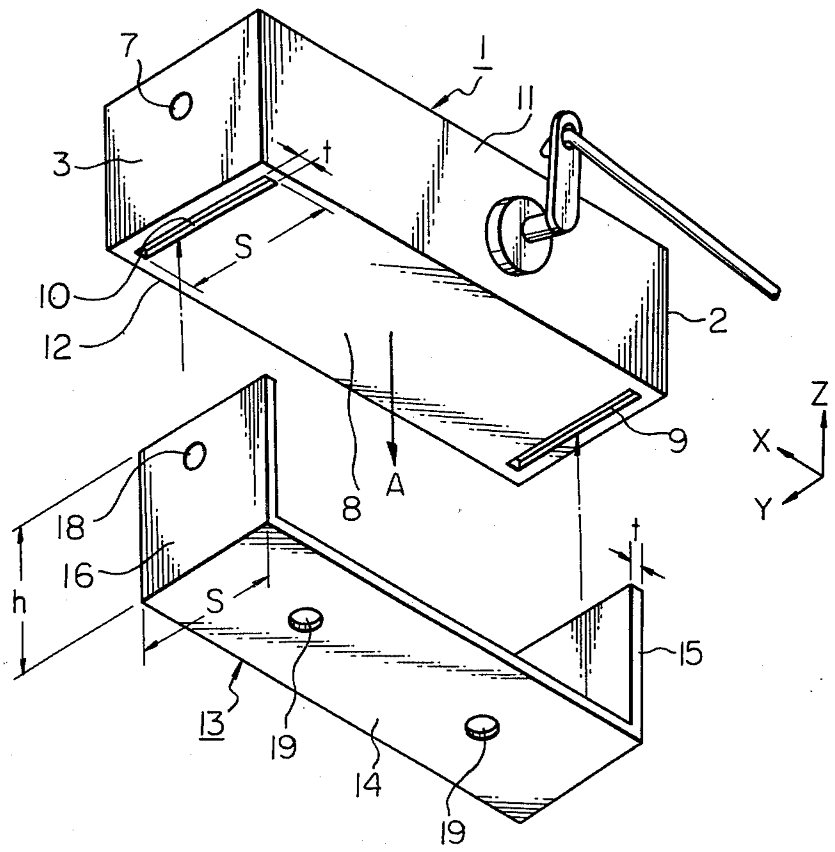
FIG. 2 is an exploded perspective view of the door closer of FIG. 1.

In FIGS. 1 and 2, shown at 1 is a generally box-shaped main body of a door closer which incorporates therein spring means 5 having reciprocable rod 4 as shown in chain lines in FIG. 1. The force of spring means 5 is transmitted through the rod 4 and a transmission mechanism (an L-shaped lever having rack teeth thereon and a pinion engaging therewith are shown in FIG. 1, and a lever shaft secured to the pinion and a link bar are shown in FIG. 2) to a door or a lintel (not shown) so as to control opening or closing movement of the door, and the rod 4 retracts or extends relative to spring means 5 in response to the movement of the door.

Retaining portions 6 and 7 are formed respectively on the inner surfaces of side walls 2 and 3 of the main body 1 by suitable means such as punching or the like. Elongated openings 9 and 10 are formed in bottom wall 8 of the main body 1 with a length corresponding to the distance s between side walls 11 and 12 of the main body 1 and a width corresponding to the thickness t of a mounting plate 13 the details of which will be described hereinafter.

The mounting plate 13 comprises a bottom plate 14 and a pair of position controlling walls 15 and 16 extending perpendicular relative to the bottom plate 14. The walls 15 and 16 are adapted to be fitted snugly in respective openings 9 and 10 and the height, width and thickness thereof are respectively h, s and t as shown in the drawings. Recessed retaining portions 17 and 18 corresponding to projecting retaining portions 6 and 7 formed on the side walls 2 and 3 of the main body 1 are formed respectively in the outer side surfaces of the walls 15 and 16. The mounting plate 13 is secured to a lintel or the door 20 by screws passing through holes 19.

In mounting the door closer, the mounting plate 13 is firstly secured to the lintel or the door 20 by using screws as shown in FIG. 1. Thereafter, the main body 1 is pushed against the mounting plate 13 with the position control walls 15 and 16 being received in the openings 9, 10 of the main body 1 respectively until the retaining portions 6 and 7 are fitted in the recessed retaining portions 17 and 18, so that the main body 1 is mounted on the mounting plate 13 as shown in FIG. 1 with the outer surfaces of the walls 15 and 16 contacting the inner surfaces of the walls 2 and 3 in face-to-face contact. During this operation, the upper portions of the walls 15 and 16 will be resiliently displaced in the directions of arrows B in FIG. 1 a slight amount.

In the embodiment of FIGS. 1 and 2, the walls 15 and 16 position the main body 1 with the upper ends of the walls abutting the upper wall 21 of the main body 1, the bottom plate 14 of the mounting plate 13 abutting the bottom wall 8 of the main body 1, and the retaining portions 6 and 7 engaging retaining portions 17, 18.

The opening or closing force of the door acts through transmission mechanism on spring means 5 in the direction of the axis of spring means 5, so that the force is applied on the walls 15 and 16 through side walls 2 and 3 of the main body 1. Therefore, no force will act on retaining portions 6 and 17 and 7 and 18 to release the engagement therebetween during opening or closing movement of the door and, therefore, the main body 1 will not fall off the mounting plate 13.

Since the walls 15 and 16 engage also with side walls 11 and 12 of the main body 1, the movement of the main body 1 in the sidewise direction (in the direction perpendicular to the paper in FIG. 1) is also controlled.

The main body 1 can simply be removed from the mounting plate 13 by applying upward pull sufficent to deform resiliently the position control walls 15 and 16 with convex retaining portions 6 and 7 riding the concave surfaces of retaining portions 17 and 18.

In FIG. 3 showing a second embodiment of the present invention, the convex retaining portion 7 in the first embodiment is replaced by retaining means 7′ comprising a ball member 7′*b* and a spring 7′*a* urging a ball member 7′*b* inwardly to project from the inner surface of the side wall 3 of the main body 1. The ball member 7′*b* engages with concave retaining portion 18′ formed in the outer surface of position control wall 16. Even though the side wall 3 is moved away from the wall 16 to some extent, the engagement between the ball member 7′*b* and the retaining portion 18′ will be reliably maintained. Similar retaining means is also provided between the side wall 2 and the position control wall 15. By providing an adjustable spring retainer on the outer end of the spring 7′a opposite the ball member 7′ it is possible to adjust the engaging force.

FIGS. 4a, 4b and 4c show third embodiment of the present invention, in which the retaining means between the main body 1 and the position control walls is further modified. A hook-shaped retaining portion 7″ is formed on the inner surface of the side wall 3 to extend extending laterally of the wall and a correspondingly shaped recess or groove 18″ defining a shoulder is formed in the wall 16 and extending in the same direction. The retaining means engages firmly in this embodiment as compared with the aforementioned two embodiments. Therefore, there is formed at least one opening 7″a in the side wall 3 for inserting a tool therethrough for pushing the wall 16 inwardly for releasing the engagement between the retaining portions 7″ and 18″. A similar retaining mechanism is also formed between the side wall 2 and the position control wall 15.

In FIGS. 5, 6a and 6b, the position control walls 15 and 16 of the mounting plate 13 of FIG. 1 are modified to engage with outer surfaces of the end walls 2 and 3 of the main body 1. In the outer surfaces of the end walls 2 and 3 there are formed fitting grooves 22 and 23 extending in the upward and downward directions for engaging with projecting portions 15′a, and 16′a formed on the inner surfaces of position control walls 15′ and 16′ with a configuration corresponding to fitting grooves 22 and 23 respectively.

Further, hook-shaped retaining portions 26 and 27 are formed on the upper ends of the walls 15 and 16 for engaging with end edge portion 21a and 21b of the upper wall 21 of the main body 1. Guide surfaces 24 and 25 are formed on the retaining portions 26, 27 to urge the walls 15′, 16′ outwardly when the main body 1 is pushed between the walls 15′, 16′ against the mounting plate 13′. To remove the main body 1 from the mounting plate 13′ the walls 15′ and 16′ are resiliently urged outwardly and the main body 1 is pulled upwardly.

The movement of the main body 1 in the direction of the axis of the spring means (horizontal direction in FIG. 5) is prevented by walls 15′ and 16′, and the movement in the sidewise direction (perpendicular to the paper of FIG. 5) is prevented by grooves 22 and 23 and projections 15′a, and 16′a.

In the embodiments, the position control walls 15 and 16 (15′ and 16′) are associated with side walls 2 and 3 of the main body 1, but it will be noted that the walls 15 and 16 may cooperate with side walls 11 and 12 or with four walls 2,3,11 and 12. Further, the main body 1 is pushed and moved in the direction perpendicular to the surface of the mounting plate 13 or to the surface of the lintel or door 20 in the embodiments, but it is possible to make the arrangement such that the mounting or releasing operation is performed by moving the main body 1 in any desired direction, for example, in the direction parallel to the surface of the member 20.

As described heretofore in detail, the mounting device according to the present invention comprises a mounting plate, a pair of position control walls formed integrally with the mounting plate for engaging with the opposite side walls of a box-shaped main body of a door closer, and a retaining mechanism disposed on the position control walls and the main body for retaining the main body on the mounting plate at a predetermined position, whereby it is possible to mount the main body on the mounting plate by a single operation in which the main body is pushed against the mounting plate whereupon the retaining mechanism engages snappingly.

The main body can be retained at a predetermined position relative to the mounting plate, whereby incidental movement or removal of the main body from the mounting plate can reliably be prevented.

Since the opening or closing force of the door is transmitted to the mounting plate through a face-to-face contact between the position control walls and the main body, the mounting device functions reliably for a long period of usage.

It is possible to provide two pairs of position control walls on a mounting plate to hold the four side walls of the main body.

What is claimed is:

1. A mounting device for a door closer comprising a generally box-shaped main body for containing the door closer mechanism, a mounting plate having a bottom plate and a pair of position control wall portions extending generally perpendicular to said bottom plate from the opposite ends thereof, one wall of said main body having a pair of elongated openings therein at positions along the inner surfaces of said opposite side walls of the main body and being complementary in shape to the cross-sectional shape of said wall portions, said openings having said position control wall portions extending therethrough into said main body with the inner surfaces of said side walls in face-to-face contact with said position control wall portions when the main body is mounted on the mounting plate, and retaining means between the position control wall portions and said opposite side walls for permitting said side walls and said position control wall portions to slide along each other as said position control wall portions are moving into said main body during mounting of said main body on said mounting plate and for retaining said main body from being pulled off said mounting plate.

2. A mounting device as claimed in claim 1 wherein the outer surface of said one wall of said main body is in face-to-face contact with said mounting plate when the main body is mounted on said mounting plate.

3. A mounting device as claimed in claim 1 wherein said retaining means comprises a projection on one of the face-to-face contacting elements and a complementary recess in the other of said face-to-face contacting elements.

4. A mounting device as claimed in claim 3 in which said projection is a spring loaded projection.

5. A mounting device as claimed in claim 3 in which said projection is integral with said one of the face-to-face contacting elements and said position wall portions are resiliently bendable toward and away from each other.

* * * * *